United States Patent Office 3,084,012
Patented Apr. 2, 1963

3,084,012
COMBINED MASS SPECTROMETER AND GAS CHROMATOGRAPH RECORDING APPARATUS
Ludolf Jenckel, Muhlenthal 15, Bremen-St. Magnus, Germany
Filed July 14, 1959, Ser. No. 827,014
Claims priority, application Germany Sept. 20, 1958
4 Claims. (Cl. 346—49)

The invention relates to a method and means for obtaining simultaneously the recording of gas chromatograms and of mass spectrograms. A method of taking mass spectrograms is described in detail in the German patent specification No. 916,677, inventor Dr. Willard H. Bennett, Fayetteville, Arkansas, United States of America.

The term "gas chromatography" covers all those chromatographic techniques in which the traditional moving liquid phase, or solvent, is replaced by a moving gas. The separations which are effected by gas chromatography thus depend upon repeated distribution of the substances to be separated between the moving gas and the fixed phase packed into the column. The fixed phase may be an absorbent (gas-adsorption chromatography) or an absorbent liquid held in an inert supporting material (gas-liquid partition chromatography).

The substances which are being separated move through the chromatographic column in the gas stream, and for the most part at temperatures below their critical temperatures so that they are technically vapours. It is convenient however, to extend the term vapour to cover all the substances which are separated on gas chromatographic columns, although some may in fact be gases. We can then restrict the term "gas" to the description of the mobile phase. Apparatus using simultaneously the two above-mentioned methods have been described by (1) Holmes, J. C., and F. A. Morrell, Applied Spectroscopy 11 (1957), 86–87.
(2) Donner, W., C. H. Johns and W. S. Gallerway, Analytical Chemistry 29 (1957), 1378.

The apparatus serves to identify components which have been recorded by the gas chromatograph but which cannot be exactly assigned to a definite component.

Moreover, it serves to separately control components represented by overlapping indications in the gas chromatogram. However, the mass spectrometer must sweep the mass range of interest within a relatively short time, i.e. within a few seconds, so that a continuous supervision of the gas flow leaving the gas chromatograph becomes possible. The rapid visualization of mass spectrograms has been hitherto obtained by means of cathode ray oscillographs utilizing amplifiers with a transient response. Record was effected by photographing the screen of the oscillograph with a recording camera. This method of visualization and recording requires considerable apparatus. Moreover, the negative of the filmed recorded spectra must be developed so that the recorded data is not immediately available. By using a special recorder which will be described hereafter, these disadvantages are avoided.

According to the invention, the recording system comprises record strip means for displaying markings representative of mass and gas partial pressures with first marking means relatively movable with respect to the length of said strip means in transverse and longitudinal directions for recording said mass markings on said strip means and second marking means also relatively movable with respect to the length of the strip means in transverse and longitudinal directions but in fixed relationship to said first marking means with respect to said longitudinal direction. The first marking means receives a signal related to mass and the second marking means receives a signal related to partial pressure. The recording strip means preferably comprises a single sheet of chart paper which provides an immediately available permanent record of mass and partial pressure to facilitate rapid interpretation of the particle mass density spectrum in the sample being analyzed. The marking means preferably comprise styli.

The movement of the first marking stylus in the transverse direction is coupled with the means provided for the variation of the mass scale in the mass spectrometer, thus either with the exciting current of the deviation magnet or with the ion accelerating voltage, in such a way that the mass range of interest is periodically swept in exactly the same time in which the marking stylus moves from the zero line to the end line of the chart paper. Currents leaving the ion trap are amplified and transformed into voltages which are conducted to the first marking stylus in order to produce a marking on the chart paper, the distance of which from the zero line corresponds to a distinct mass number. It is thus possible to obtain immediately the information required about the masses of the different ions in the mass spectrum.

In most cases it is, however, not sufficient to know only the masses of the different ions but it is also required to record their concentration in order to be able precisely to evaluate the mass spectrum. A rough indication of the intensity of a recorded ion current is already given by the extent and the shading of the marking. In order to obtain the smallest still visible marking a minimum voltage at the first marking stylus is required and consequently a minimum ion current at the load resistance of the above mentioned amplifier.

When sweeping the mass scale this voltage is exceeded for a longer time with stronger ion peaks than with weaker ones. The stronger ion currents thus produce transverse to the longitudinal direction wider markings than with weaker ion currents. The minimum voltage is, however, likewise earlier attained with the stronger peaks with the increase of the partial pressure of the gas components and will decrease later than weaker peaks. Stronger ion currents will thus be indicated by broader longitudinal markings than weaker ion currents.

A higher voltage at the first marking stylus will finally produce darker blackings on the paper than a smaller voltage. The individual ion currents will thus appear on the chart paper as trapezoids with diagonal lengths and contrast proportional to ion current.

For more exact measurements of the ion currents the sensitivity of the chart paper is not constant enough as the sensitivity varies to an extent which cannot be admitted. Nevertheless increased accuracy can be attained by using a trigger action relay with an exactly determined sweep voltage. The trigger action relay passes a definite recording voltage to the first marking stylus as long as the output voltage of the mass spectrometer exceeds the sweep voltage. Also with this arrangement trapezoidal markings are obtained which have, however, a uniform blackness. A specially favourable result is obtained in that simultaneously with the mass spectrogram, a gas chromatogram is recorded by the second marking means on the time axis so that the beginning and end marks of the trigger voltage are applied to the simultaneously recorded continuous curve of the output voltage of the gas chromatograph. On the basis of the Y-values of this curve, the reciprocal values of the ion current intensity can be determined.

The foregoing and other objects and features of my invention will be apparent from, or will be referred to in the following description of the embodiments of my invention as specified in the attached drawings in which.

Figure 2:
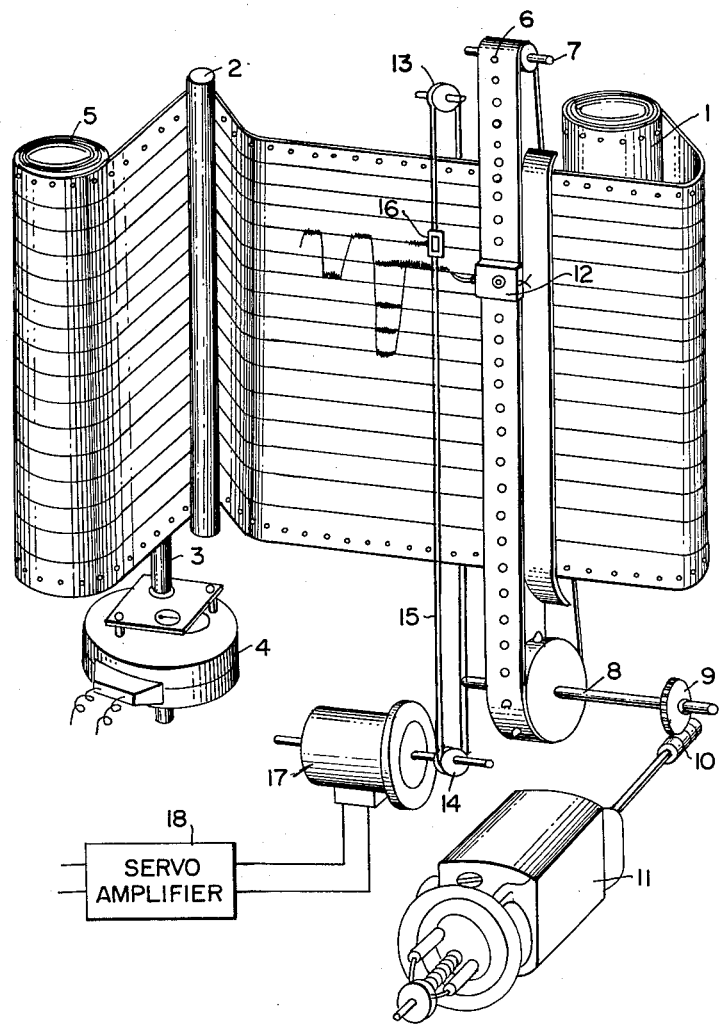
FIG. 2 is a schematic diagram of an apparatus according to my invention which can be used for simultaneous recording of gas chromatograms and of mass spectrograms.

With reference now to the drawing and more particularly FIG. 2 thereof, there is shown an embodiment of the invention.

The chart paper 1 is advanced by means of a paper transport mechanism comprising a pressing bar 2, a motor shaft 3, motor 4 and a take-up roll 5. The rubber ribbon 6 is supported by a supporting roller 7 and driven by a toothed wheel 8. The toothed wheel 8 is arranged on a shaft carrying a worm drive 9 which meshes with a worm 10 fitted to the driving shaft of a motor 11. Fitted to the rubber ribbon there are one or more marking styli 12 for recording mass data. The recording device comprises likewise a second recording mechanism consisting of a supporting wheel 13, a drive wheel 14, a dial cable 15 to which the marking stylus 16 is fitted for recording partial pressure data, a servo motor 17 controlled by the servo amplifier 18.

A mass spectrogram is recorded simultaneously with the gas chromatogram either on the same chart paper or on a chart paper arranged in parallel to the chart paper of the gas chromatograph. The paper advance speed is the same in both cases.

Figure 1:
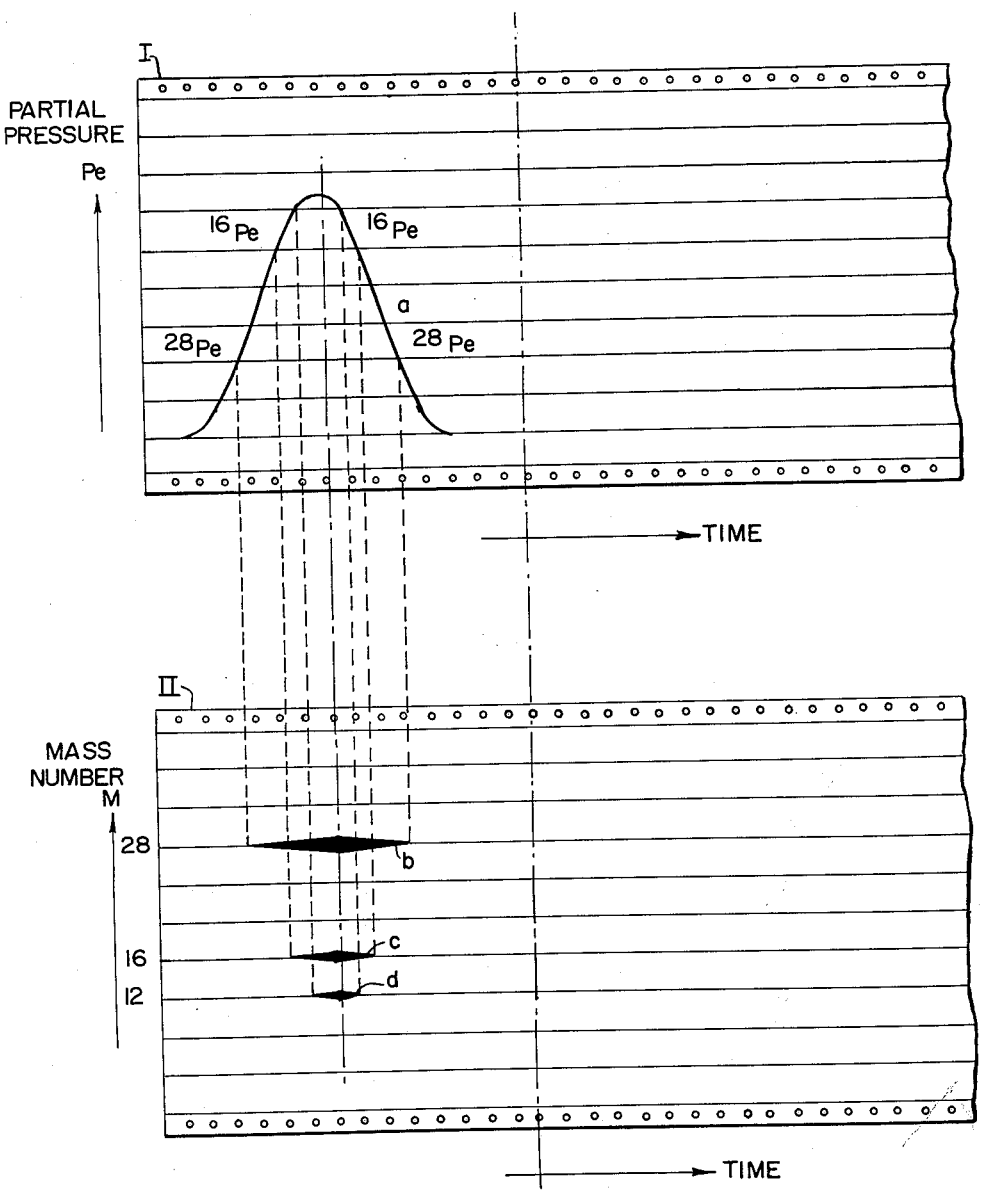
FIG. 1 shows the recording charts I and II, I being a chart as obtained from a gas chromatograph and II a chart from a mass spectrometer. Both charts are advanced in a synchronous manner.

The marking stylus 12 of the mass spectrometer passes periodically over the chart paper and perpendicularly to the advance direction of the paper. A marking is, however, only made, when the output voltage of the mass spectrometer is supplied to the marking stylus 12. The marking stylus 16 of the gas chromatograph passes during the sweeping of the mass range continuously over the chart paper and makes continuous curves like $a$ (FIG. 1) on the paper. As shown in FIG. 1 on chart II, trapezoidal recordings, e.g. the recordings $b$, $c$ and $d$ are obtained corresponding to the masses 12, 16 and 28 of the mass scale M. The relative intensities of the ion currents can by means of the gas chromatogram be derived from the diagonals of the trapezoid in paper advance direction. If for example in FIG. 1 the two ion currents corresponding to the mass number 28 and to the mass number 16 are compared then the peak 28 is recorded with a partial pressure $28_{pe}$, whereas peak 16 is recorded with a partial pressure $16_{pe'}$. As the ion currents are proportional to the product of partial pressure and relative abundance and as the marking starts with a constant ion current intensity, the ion current corresponding to the mass numbers 28 and 16 resp. are inversely proportional to those indicated by the gas chromatogram, e.g. partial pressures $28_{pe}$ and $16_{pe}$, as described above.

$$\frac{16_{pe}}{28_{pe}} = \frac{28_I}{16_I}$$

The values $16_{pe'}$ and $28_{pe'}$ where the projections of the spectrogram mass markings intersect the gas chromatogram curve, thus finish an additional check of the ion current ratio.

As can be seen from FIG. 1, the determination of the ion current ratio becomes very inexact if the current intensities are very great so that one if not even both $pe$-values to be compared become very small so that it is difficult to read them in the gas chromatogram. The highest accuracy of the measurements will be of course obtained if all $pe$-values are in the straight part of the curve of the gas chromatograph where the curve has its greatest slope.

In case of ion currents of a greater intensity, higher accuracy can be obtained by increasing the critical threshold signal and by consequently reducing the extent of the mass markings in direction of the paper advance. It is evident that eventually ion currents of smaller intensity which have, however, no influence on the evaluation of a mass spectrogram are no longer recorded. It should therefore be possible to adjust the most favourable recording conditions for the elaboration of a mass spectrogram by pre-adjustment of the threshold signal, though this would require a repeating of the gas chromatographic measuring cycle.

The following procedure obviates the need for such repetition. As soon as the projection of the spread of the mass spectrogram falls outside the chromatogram curve, the threshold signal is automatically increased by a certain factor, i.e. by the factor 5, so that the projection, now of reduced spread, comes to lie on the straight portion of the chromatogram curve. Automatic change-over can be effected by known electronic means after differentiation of the output voltage of the gas chromatograph.

It is evident that for an exact evaluation of the mass spectrogram the corresponding peaks in the gas chromatogram must be high enough and the recording sensitivity be adapted to the concentration of the corresponding components.

The accuracy in the quantitative evaluation of the mass spectrogram depends on the exact synchronizing of the partial pressure recording in the gas chromatogram to the mass recording in the mass spectrogram. For this reason and of course also for saving costs, it is preferable to make both recordings on the same paper chart. For effecting this, both recording systems have to be arranged side by side, as shown in FIG. 2. The different geometric loci of the marking styli result in a retarded recording which has to be taken into account, but this retarding can be compensated by electrical means. In general it will not be difficult to distinguish the continuous and steady pass of the output voltage as recorded by the gas chromatograph from the discontinuous trapezoidal markings of the ion currents.

I claim:

1. Means for simultaneous recording of mass spectrograms and gas chromatograms comprising at least two recording devices, the first consisting of a recording chart, the chart transport mechanism and an endless perforated ribbon having at least one marking stylus fitted to same and means for moving the latter stylus periodically over the recording chart, the second recording device consisting each of at least one supporting wheel, a drive wheel, a dial cable, to which a second marking stylus is fitted and a servo motor controlled by a servo amplifier, including means for recording an indication of ion currents with the first stylus and controlling the latter recording with a threshold signal such that the starting means and the interruption of the markings obtained by the stylus attached to the rotating ribbon affects the second marking stylus provided for the recording of the continuous curve so that the inverse ratio of two ion current intensities can be determined by superimposing the output voltage of a gas chromatograph to the discontinuous curve as recorded by the stylus of a mass spectrograph means for applying the output voltage of a gas chromatograph analysis of a sample to said second stylus, and means for applying the voltage representative of a mass spectrograph of said sample to said first-mentioned stylus.

2. Apparatus for simultaneously and synchronously recording a mass spectrogram and a gas chromatogram both related to the same sample apparatus comprising, means for analyzing a sample to substantially simultaneously develop a first signal representative of mass spectra of said sample and a second signal representative of partial pressure of said sample, means for imparting relative movement between first marking means and recording strip means in a longitudinal direction along the length of the latter and imparting relative movement between second marking means and said recording strip means along said longitudinal direction while maintaining said first and second marking means relatively fixed along said longitudinal direction, means for imparting relative movement between said first marking means and said recording strip means in a transverse direction perpendicular to the length of the latter means so that the position of said first marking means with respect to a longitudinal edge of said recording strip means corresponds to the value of mass of particles then being accepted by mass selective means which provides said first signal proportional to the number of particles then being selected, means for applying the latter signal to said first marking means to intensify said recording strip means at said position proportional to said number and produce trapezoidal markings thereon with contrast and diagonal lengths proportional to the current produced by said selected particles, and means for continuously positioning said second marking means in correspondence with said second signal along said transverse direction relative to a longitudinal edge of said recording strip means to a point thereon then indicative of gas partial pressure in said mass selective means.

3. Apparatus in accordance with claim 2 and further comprising means for preventing said first marking means from inscribing a visible mark on said recording strip means until said first signal proportional to the number of particles exceeds a prescribed threshold value.

4. Apparatus in accordance with claim 3 and further comprising means for increasing said threshold value after the peak value of said first signal has been reached.

References Cited in the file of this patent

UNITED STATES PATENTS

| | | |
|---|---|---|
| 2,276,423 | Silverman | Mar. 17, 1942 |
| 2,470,745 | Schlesman | May 17, 1949 |
| 2,557,196 | Nelson | June 19, 1951 |
| 2,596,305 | Stevens | May 13, 1952 |

OTHER REFERENCES

Phillips: "Gas Chromatography," pages 48 and 49, published 1956, Academic Press, Inc., N.Y.C.